W. S. CORLIS.
SANITARY MILK DRIP CATCH BASIN.
APPLICATION FILED OCT. 25, 1919.

1,374,825. Patented Apr. 12, 1921.

Witness
Chas. L. Griesbauer

Inventor
Wilson S. Corlis,
By Eugene C. Brown
Attorney

UNITED STATES PATENT OFFICE.

WILSON S. CORLIS, OF MOUNT VERNON, NEW YORK.

SANITARY MILK-DRIP CATCH-BASIN.

1,374,825.  Specification of Letters Patent.  Patented Apr. 12, 1921.

Application filed October 25, 1919. Serial No. 333,196.

*To all whom it may concern:*

Be it known that I, WILSON S. CORLIS, a citizen of the United States, residing at Mount Vernon, in the county of Westchester and State of New York, have invented certain new and useful Improvements in Sanitary Milk-Drip Catch-Basins, of which the following is a specification.

This invention relates to dispensing covers for milk cans which will enable dealers or store keepers to pour the milk from the measuring vessel into the customer's bucket or receptacle without danger of contaminating the supply in the can by drippings from the customer's receptacle.

When milk is measured from a supply can and poured into a bucket, pitcher or other receptacle brought by a customer, the drippings from the outside of the measuring cup or vessel and frequently from the outside of the customer's receptacle, fall back into the milk can, especially if the dealer or clerk is careless. It has heretofore been proposed to provide a hopper terminating in a spout, the hopper being supported from a cover and extending laterally so as to overhang the can. Such prior devices are not only complicated but require specially constructed measuring devices. My invention provides a very simple device which is applicable to the type of supply milk cans now universally used and which permits the use of the measuring vessels usually employed to drip milk from the supply cans.

In the following description I shall refer to the accompanying drawings in which—

Figure 1:
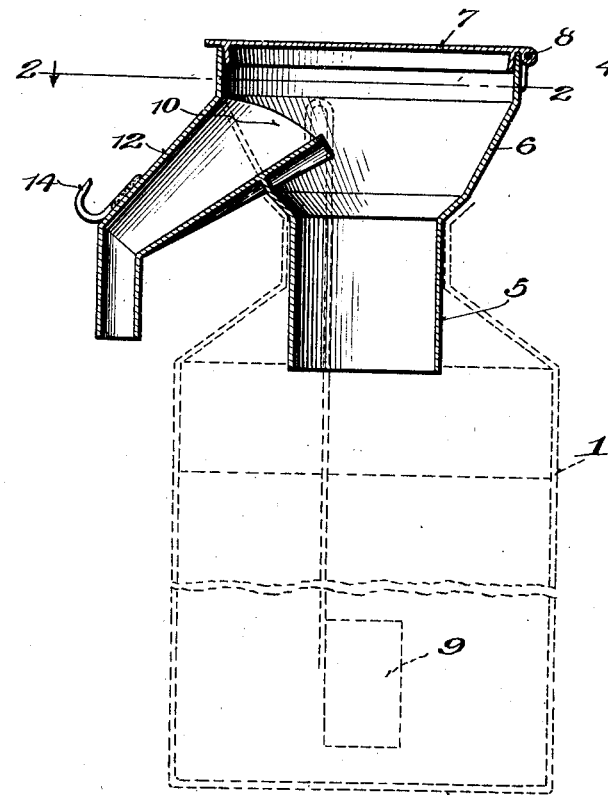
Figure 3:
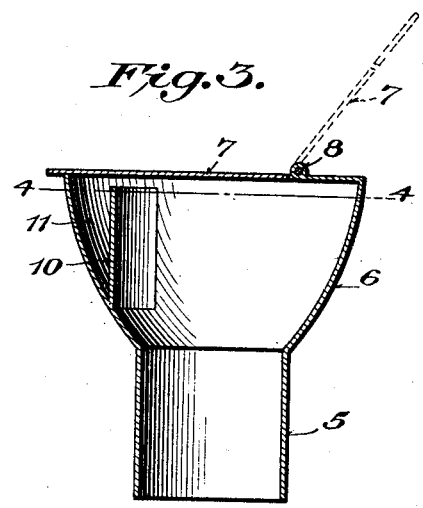
Figure 4:
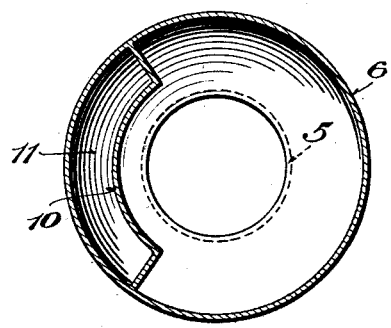
Figure 2:
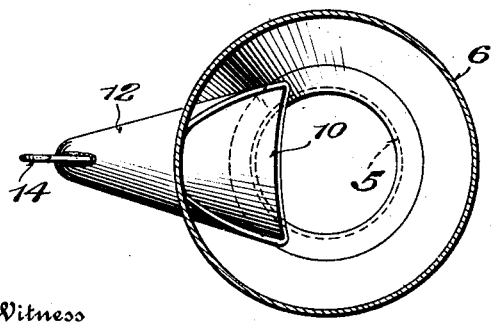

Figure 1 is a vertical sectional view of a milk can cover embodying one form of my invention; Fig. 2 is a transverse sectional view on the line 2—2 of Fig. 1; Fig. 3 is a vertical sectional view of another form of milk can cover embodying my invention; and Fig. 4 is a transverse sectional view on the line 4—4 of Fig. 3.

The dealer's milk can now universally employed is indicated in dotted lines at 1, the upper end tapering upwardly and terminating in a contracted tubular throat or mouth. My sanitary cover is a sheet metal structure provided with a lower cylindrical portion 5 adapted to enter the tubular mouth of the can, and a funnel shape upper portion 6, which rests upon the rim of the can so that its outwardly flaring walls overhang the tapering portion of the can and are concentric therewith. The lid 7 is hinged at 8 and when closed projects over the rim of the funnel. When the lid is raised and thrown back, the mouth of the can is substantially unobstructed so that a measuring cup or vessel 9 may be used in the usual manner.

For the purpose of catching the drippings which run down upon the outside of the measuring cup and to enable the storekeeper to readily and quickly fill the containers brought by the customers, while maintaining the can and its surroundings at all times free from the drippings of milk and in a perfectly sanitary condition, I provide a pocket to receive such drippings and which is normally protected within the inclosure of the funnel.

In the form shown in Figs. 1 and 2, the partition member 10 projects obliquely upward from the inner wall of the funnel, the sides and bottom of the partition being soldered to the funnel wall so that it forms an integral part thereof. A pocket is thus formed within the inclosure of the funnel which is located laterally of the central opening of the tubular portion 5 so as to leave said opening unobstructed, for the manipulation of the cup 9, but inclosing a space between the wall of the funnel and the inner wall of the partition sufficient to catch all of the drippings which run down the outside of the measuring cup as the milk is being poured therefrom. In the form shown in Fig. 1, an opening is provided in the side of the funnel and the partition member is prolonged into a spout 12, through which the milk is delivered into the bucket or other container. A hook 14 may be provided to hold the bail of the bucket while the milk is being poured thereinto.

In the form shown in Figs. 3 and 4, there is no spout entering the pocket inclosure, the milk being poured directly from the measuring cup into the customer's bucket or pitcher, while the drippings from the measuring cup and any that may run down the outside of the bucket fall into the pocket 11, where they collect until they are periodically emptied. In this form, as in the form shown in Fig. 1, the pocket or catch basin is located at one side and out of alinement with the opening of the tubular neck 5 so as to leave the latter unobstructed. The outwardly flaring wall of the funnel is admirably adapted to the purpose of my invention, giving ample space for the pocket or catch basin between the central opening and the margin.

I have described in detail the particular constructions illustrated in the accompanying drawings but desire it to be understood that various changes and modifications can be made in the structure without departing from my invention. I have illustrated the catch basin as being soldered to form an integral part of the funnel but it may be separate or detachable therefrom and may be located either inside or outside of the funnel wall provided it is situated in such a way that the waste milk or drippings will be caught in the pocket or catch basin.

I claim:—

1. A sanitary cover for milk cans, comprising a funnel having a cylindrical lower portion adapted to be inserted in the mouth of the usual delivery milk can, and an upper flaring or funnel-shape portion concentric with the lower portion and provided with a hinged lid, and a partition member soldered along its bottom and lateral edges to the inner wall of the funnel portion to thereby form a pocket extending within the inclosure of the funnel, whereby any drippings from a dispensing vessel will be caught by said pocket.

2. A sanitary cover for milk cans, comprising a funnel having a cylindrical lower portion adapted to be inserted in the mouth of the usual dealer's milk can and an upper flaring or funnel shape portion, said upper portion being provided with a pocket within the enclosure thereof and positioned laterally of the opening in said cylindrical portion and so that any drippings from the milk being poured into a receptacle will fall into said pocket.

In testimony whereof I affix my signature.

WILSON S. CORLIS.